United States Patent [19]

Lemasters

[11] 4,264,095
[45] Apr. 28, 1981

[54] ADJUSTABLE SNOW SHOVEL

[76] Inventor: Winfield S. Lemasters, R.D. 7, Box 308, Washington, Pa. 15301

[21] Appl. No.: 9,960

[22] Filed: Feb. 6, 1979

[51] Int. Cl.³ .............................................. E01H 5/02
[52] U.S. Cl. ...................................... 294/53.5; 37/53; 294/54; 403/57
[58] Field of Search .................... 294/49, 51, 52, 53.5, 294/54, 56, 57, 58; 15/144 A; 16/110 R; 37/53; 56/400.04, 400.18, 400.19; 172/372; 403/57, 58, 74

[56] References Cited
U.S. PATENT DOCUMENTS

| | | | |
|---|---|---|---|
| 432,130 | 7/1890 | Fenton | 403/57 X |
| 827,542 | 7/1906 | Lawson | 294/54 X |
| 1,319,912 | 10/1919 | Starrett et al. | 294/51 |
| 1,687,190 | 10/1928 | Wulff | 294/58 |
| 1,687,953 | 10/1928 | Starks | 403/58 |
| 1,800,349 | 4/1931 | Hurason | 403/57 |
| 2,266,542 | 12/1941 | Fox | 37/53 |
| 2,396,089 | 3/1946 | Cross | 294/54 |
| 2,919,153 | 12/1959 | Benton | 294/51 |

Primary Examiner—Johnny D. Cherry
Attorney, Agent, or Firm—Harvey B. Jacobson

[57] ABSTRACT

A blade and a handle assembly are provided with the blade assembly including a pair of generally right angulated first and second sections joined together along adjacent marginal portions. The first section of the blade assembly includes a scraping edge remote from the second section of the blade assembly and the handle includes base and free ends. A mount is supported from the second blade assembly section for limited angular adjustment about an axis generally normal to the second section and a base end of the handle is pivotally secured to the mount for limited angular adjustment relative thereto about an axis transverse to the handle, normal to the first mentioned axis and generally paralleling the first section of the blade. Further, a hand grip assembly is carried by the handle intermediate the base and free ends thereof and is lengthwise and angularly adjustable along and about the handle.

7 Claims, 8 Drawing Figures

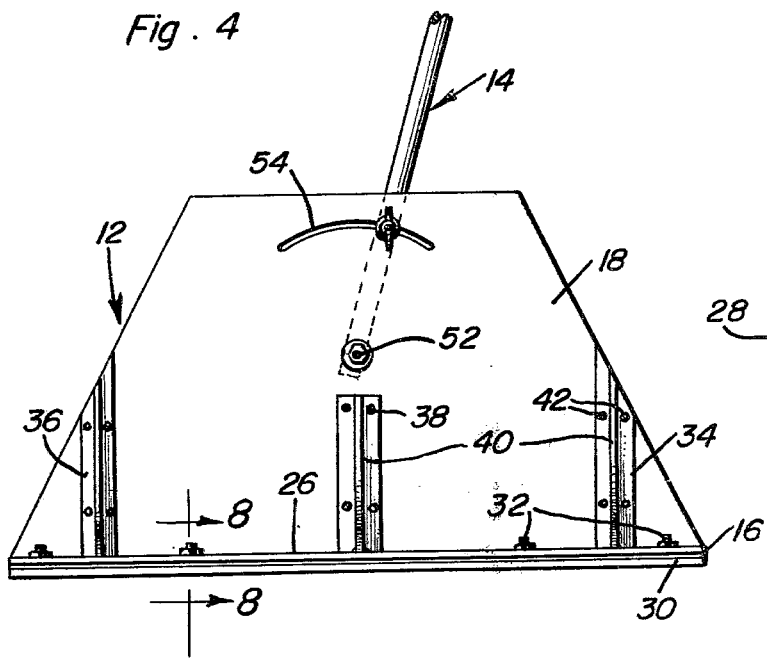
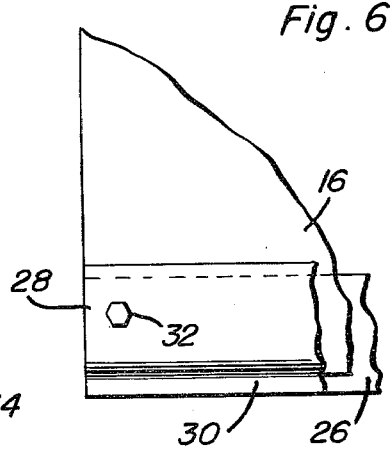
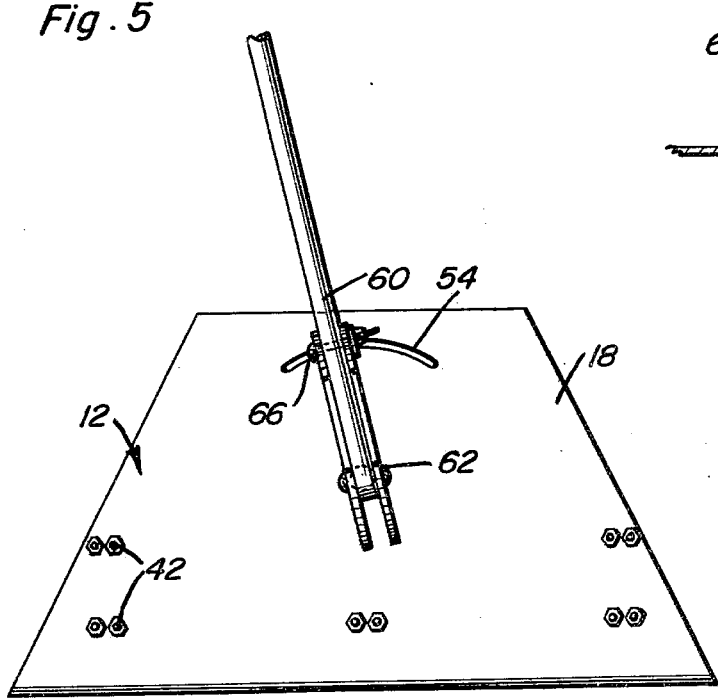
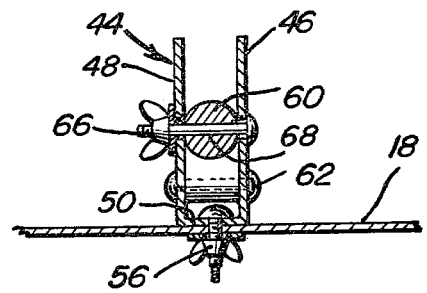

ADJUSTABLE SNOW SHOVEL

BACKGROUND OF THE INVENTION

The problem of removing snow from residential walks and driveways has long plagued persons who live in northern climates where snow fall occurs frequently. Although there are many forms of mechanized snow removing equipment, these forms of equipment are expensive, powered by engines which are sometimes difficult to start in cold weather, represent accident hazards and are heavy and thus difficult to store and remove from storage. Accordingly, a great majority of people still rely upon conventional snow shovels. Although conventional snow shovels may be used effectively to remove snow cover from driveways and walkways, deep heavy snows require a tremendous amount of energy to shovel clean walkways and driveways. Also, many older persons experience heart attacks as a result of infrequent difficult snow shovelling.

Accordingly, a need exists for an improved form of shovel which can be used to shovel clear snow covered driveways and walkways with a minimum of effort. Although various forms of snow shovels have been heretofore designed in order to attempt to provide a snow shovel which may be utilized to remove snow with less effort, most of these attempts at providing an improved snow shovel have fallen short of accomplishing maximum results.

Examples of some of these previously known forms of improved snow shovels including some of the general structural and operational features of the instant invention are disclosed in U.S. Pat. Nos. 473,250, 923,994, 1,667,591, 1,803,717, 1,810,026, 1,847,133, 2,919,153, 2,967,363 and 3,078,604.

BRIEF DESCRIPTION OF THE INVENTION

The snow shovel of the instant invention includes a blade assembly which is generally L-shaped in configuration and includes first and second generally right angulated sections joined together along adjacent marginal portions. The edge of the first section remote from the second section defines a scraping edge and a mount is supported from the second section for limited angular adjustment about an axis generally normal to the second section. The base end of an elongated handle is pivotally secured to the mount for limited angular adjustment relative to the mount about an axis transverse to the handle, normal to the first mentioned axis and generally paralleling the second section. Further, a hand grip assembly is carried by the handle intermediate its opposite ends and is slidably and rotatably mounted thereon and releasably secured in adjusted position on the handle between the free and base ends thereof.

The main object of this invention is to provide an improved form of shovel which may be utilized to pull snow toward the user of the shovel or to cut the desired quantity of snow out of snow cover that is being worked upon for swinging the snow laterally of the user.

Another object of this invention is to provide an improved snow shovel constructed in a manner whereby it may be used for shoveling snow with a minimum amount of effort on the part of the user.

Still another object of this invention is to provide a snow shovel having a second hand grip thereon thereby enabling a load of snow supported from the blade portion of the shovel to be more efficiently lifted.

A final object of this invention to be specifically enumerated herein is to provide an improved snow shovel in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged fragmentary front elevational view;

FIG. 5 is an enlarged fragmentary rear elevational view;

FIG. 6 is an enlarged fragmentary rear elevational view of one end of the scraping edge of the shovel;

FIG. 7 is an enlarged sectional view of the structure by which the handle assembly is supported from the blade assembly; and FIG. 8 is an enlarged fragmentary vertical sectional view taken substantially upon the plane indicated by the section line 8—8 of FIG. 4.

DETAILED DESCRIPTION OF THE INVENTION

Figure 1:
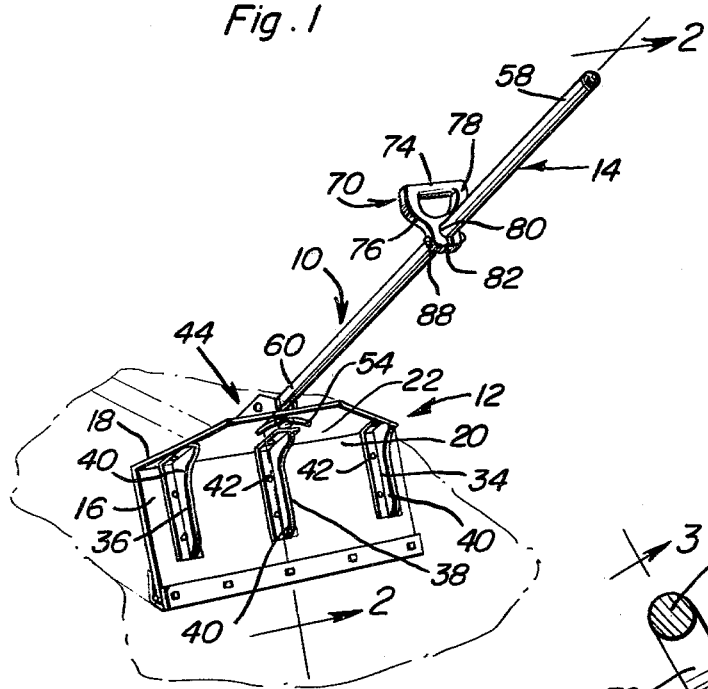
FIG. 1 is a perspective view of the shovel.
Figure 2:
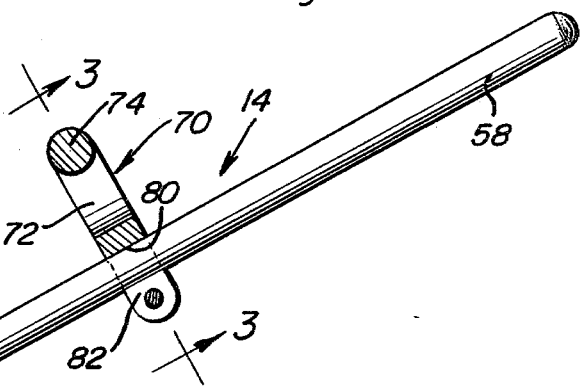
FIG. 2 is an enlarged vertical sectional view taken substantially upon the plane indicated by the section line 2—2 of FIG. 1.
Figure 3:
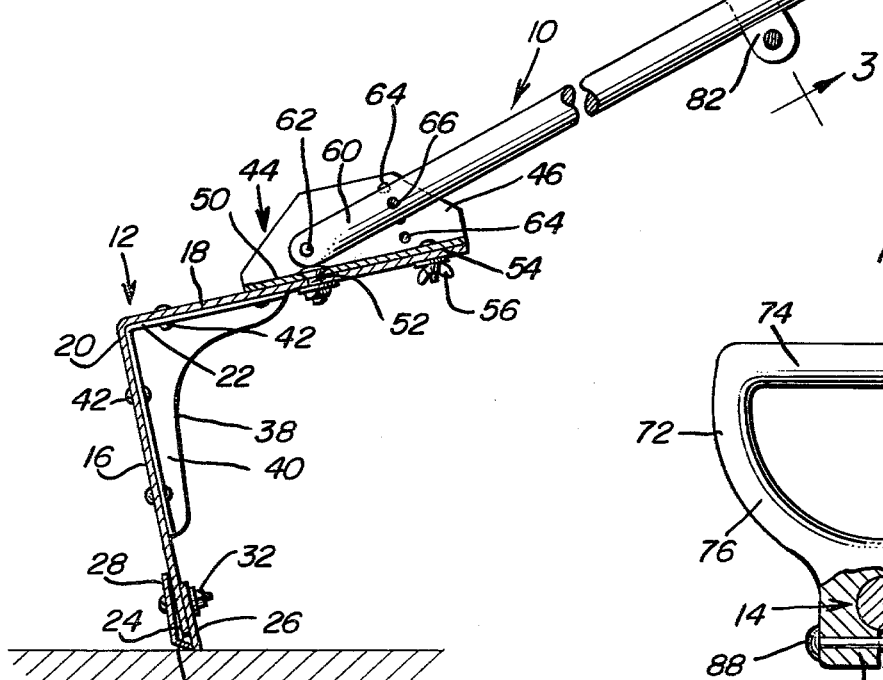
FIG. 3 is an enlarged transverse sectional view taken substantially upon the plane indicated by the section line 3—3 of FIG. 2.
Figure 3:
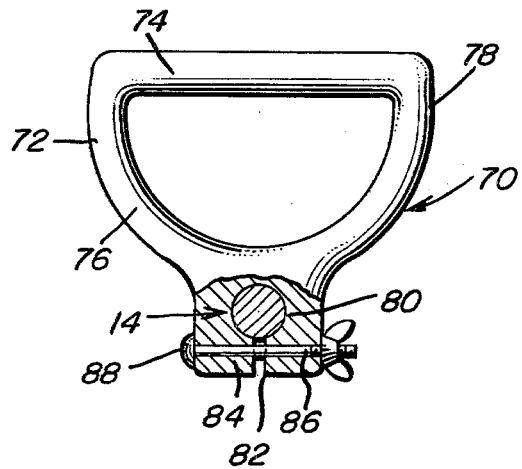

Referring now more specifically to the drawings, the numeral 10 generally designates the improved snow shovel of the instant invention. The shovel 10 includes a blade assembly referred to in general by the reference numeral 12 and a handle referred to in general by the reference numeral 14.

The blade assembly 12 includes first and second blade sections 16 and 18 disposed at generally right angles relative to each other and formed from a single piece of sheet metal, such as aluminum. The first and second sections 16 and 18 include adjacent marginal edges 20 and 22 which are integral with each other and the first section includes an edge portion 24 remote from the edge portion 20. The front surface of the edge portion 24 has a flat bar 26 disposed thereover and the rear surface of the edge portion 24 has a similar bar 28 disposed thereover including an angulated longitudinal edge portion 30. The bars 26 and 28 are secured to the front and rear sides of the edge portion 24 by fasteners 32 secured through the bars 26 and 28 and the edge portion 24. The fasteners 32 may comprise rivets.

The first and second sections 16 and 18 include three L-shaped brace members 34, 36 and 38 secured over the front surfaces thereof and each of the brace members 34, 36 and 38 is generally in the form of a conventional L-shaped shelf bracket including a center reinforcing rib 40. The brace members 34, 36 and 38 are secured to the blade assembly 12 by means of suitable fasteners 42.

A generally U-shaped mount referred to in general by the reference numeral 44 and including a pair of opposite sides 46 and 48 interconnected by means of a bight portion 50 is provided and one end of the bight portion 50 is pivotally attached to the rear side of the second section 18 by a pivot fastener 52. The second section 18 includes an arcuate slot 54 having the pivot fastener 52 as its center of curvature and a clamp-type fastener 56 is provided and is secured through the end of the bight portion 50 remote from the fastener 52 and is slidably received in the slot 54. Thus, the mount 44 may be angularly adjusted relative to the second section 18 about the pivot fastener 52 and secured in adjusted angular position by means of the clamp-type fastener 56.

The handle 14 includes free and base ends 58 and 60 and the base end 60 is pivotally anchored between the sides 46 and 48 above the pivot fastener 52 by means of a pivot fastener 62 secured through the base end 60 and the sides 46 and 48. Also, the sides 46 and 48 include registered bores 64 disposed in arcuate paths with the pivot fastener 62 at the center of curvature thereof and a fastener 66 is secured through one pair of corresponding bores 64 and a diametric bore 68 formed in the base end 60 of the handle 14. Accordingly, the handle 14 may be secured in adjusted rotated position relative to the mount 44 and the latter may be secured in adjusted angular position relative to the second section 18 of the blade 12.

The handle or hand grip 14 includes a secondary handle referred to in general by the reference numeral 70. The secondary handle includes a generally Y-shaped frame 72 having a hand grip member 74 secured between the free ends of the arms 76 and 78 of the frame 72. The leg of the frame is provided with a bore 80 formed therethrough and the free end of the leg is provided with a longitudinal slot 82 opening into the bore 80 along a diameter thereof. Also, those portions of the leg of the frame 72 disposed on opposite sides of the slot 82 are provided with aligned bores 84 and 86 formed therethrough and a threaded clamp fastener 88 is passed through the bores 84 and 86.

The frame 72 of the secondary handle 70 is slidably mounted on the handle 14 with the latter slidably and rotatably received through the bore 80. The secondary handle 70 may be adjusted longitudinally of the handle 14 and angularly thereabout as desired and then retained in adjusted position by tightening the clamp fastener 88.

In operation, the secondary handle 70 is preferably supported from the handle 14 with the hand grip member 74 spaced to the rear of the handle 14. The lengthwise positioning of the handle 70 along the handle 14 may be readily adjusted according to the person using the shovel 10 and the angulated edge portion 30 of the bar 28 functions as a skid portion when the blade assembly 12 is slid forwardly or backwardly along a surface from which snow is to be removed.

With the handle 14 adjusted to substantially parallel the second section 18 of the blade assembly 12, the first section 16 of the blade assembly 12 may be advanced horizontally into snow cover to be shoveled and the handle 14 and hand grip member 74 may be utilized to slightly vertically displace the shovel 10 in order that the portion of the snow cover disposed above the first section 16 of the blade assembly 12 may be "broken" from the surrounding snow. Thereafter, that portion of snow on the shovel may be dragged to a dumping area. On the other hand, when the handle 14 is adjusted so as to be inclined relative to the second section 18 of the blade assembly 12 and the mount 44 is also adjusted appreciably away from its center position, a quantity of snow disposed on the first section 16 of the blade assembly 12 may be readily swung in a convenient manner to a point of discharge.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A snow shovel including a blade assembly and a handle, said blade assembly including a pair of generally right angulated first and second sections joined along adjacent marginal portions, the first section including a scraping edge remote from said second section, said handle including base and free ends, a mount supported from said second section for limited angular adjustment about an axis generally normal to said second section, said base end of said handle being pivotally secured to said mount for limited angular adjustment relative to said mount about an axis transverse to said handle, normal to the first mentioned axis and generally paralleling said second section, and a hand grip carried by said handle intermediate said base and free ends, said mount comprising a channel-shaped member including opposite sides interconnected by means of a bight portion extending between and formed integrally with corresponding marginal edges of said sides, one end of said bight portion being pivotally mounted from said second section of said blade assembly adjacent said first section and for angular displacement about said first mentioned axis generally normal to said bight portion, said second section of said blade assembly having an arcuate slot formed therein with said first mentioned axis comprising the center of curvature of said arcuate slot, a clamp fastener secured through the other end of said bight portion and said slot and slidable therein, said sides of said mount including aligned transverse bores adjacent said first axis, said base end of said handle including a diametric bore formed therethrough, and a pivot fastener secured through said aligned bores and said diametric bore.

2. The combination of claim 1 wherein said hand grip is mounted on said handle for adjustable shifting therealong as well as adjustable angular shifting thereabout.

3. The combination of claim 2 wherein said hand grip includes clamp means for releasably retaining said hand grip in adjusted position on said handle.

4. The combination of claim 1 wherein said sides include sets of aligned bores arranged in arcuate paths having said pivot fastener as their centers of curvature, a diameteric bore formed through said base end of said handle registrable with the last mentioned aligned bores and a fastener removably secured through the last mentioned diametric bore and a selected pair of the last mentioned aligned bores.

5. The combination of claim 4 wherein the included angle side of said blade assembly includes transversely spaced L-shaped reinforcing brackets overlying and secured to said first and section sections of said blade assembly.

6. The combination of claim 5 wherein said hand grip is mounted on said handle for adjustable shifting therealong as well as adjustable angular shifting thereabout.

7. The combination of claim 6 wherein said hand grip includes clamp means for releasably retaining said hand grip in adjusted position on said handle.

* * * * *